Feb. 11, 1969  F. G. CHESLEY  3,426,920
VACUUM MANIPULATOR

Filed July 11, 1966  Sheet 2 of 2

INVENTOR.
FRANK G. CHESLEY
BY
Braddock + Burd
ATTORNEYS

United States Patent Office 3,426,920
Patented Feb. 11, 1969

3,426,920
VACUUM MANIPULATOR
Frank G. Chesley, Red Wing, Minn., assignor to Central Research Laboratories, Inc., Red Wing, Minn., a corporation of Minnesota
Filed July 11, 1966, Ser. No. 564,349
U.S. Cl. 214—1
Int. Cl. B25j 3/00
7 Claims

ABSTRACT OF THE DISCLOSURE

A sealed manipulator for performing work inside a vacuum chamber from the outside, without penetration of the vacuum-confining barrier by the motion transmission members. The manipulator has a wide degree of freedom of motion within the vacuum chamber through a universal joint providing for rotary and longitudinal movement. A series of vacuum-tight bellows surround the arm within the vacuum chamber to provide a vacuum-tight barrier permitting translation of the manipulator on its longitudinal axis and rotation and revolution of the tong means and opening and closing thereof without any penetration of the vacuum-tight barrier.

---

This invention relates to a sealed manipulator for use in a closed chamber subjected to vacuum conditions by an operator outside of that chamber.

Although sealed mechanically operated remote control master slave type manipulators are known by which an operator may perform work in a chamber under different environmental conditions, such manipulators are ill suited for use under high vacuum conditions. The reason for this is that the manipulative motions must be transmitted through seals, primarily rotary seals, which, when subjected to great pressure differentials are subject to leakage and failure.

It is the principal object of the present invention to provide a sealed manipulator for use in a vacuum with a wide degree of freedom of motion within the vacuum chamber, without requiring any penetration through the barrier confining the vacuum conditions by motion transmission members through a seal involving mated but movable parts. Broadly stated, the manipulator according to the present invention comprises a rigid elongated arm extending through the wall of a chamber enclosing a vacuum and supported in a universal joint for rotary and sliding longitudinal movement. One end of the arm is provided with tong means and the opposite end is provided with handle means for moving the arm and operating the tongs. The tong means are coupled to the elongated arm for rotation and translation therewith. By means of a sliding coupling the tongs may be opened and closed by operation of a lever in the handle. A series of vacuum-tight bellows surround the arm in its extension from the inside of the vacuum chamber wall to the tong means to provide a vacuum-tight barrier wall which permits translation of the manipulator on its longitudinal axis and rotation and revolution of the tong means and opening and closing thereof without any penetration of the vacuum-tight barrier by a seal of mated but movable surfaces.

Figure 1:
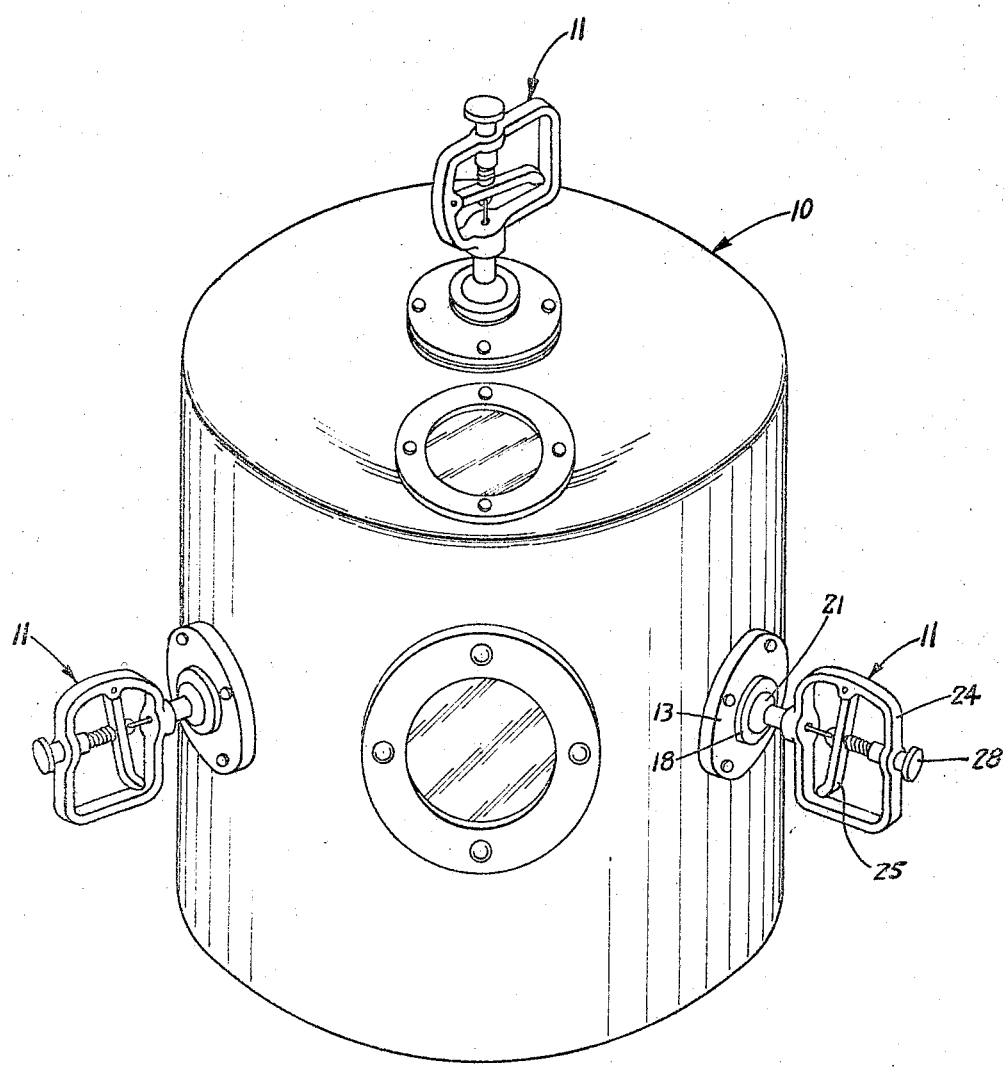
Figure 2:
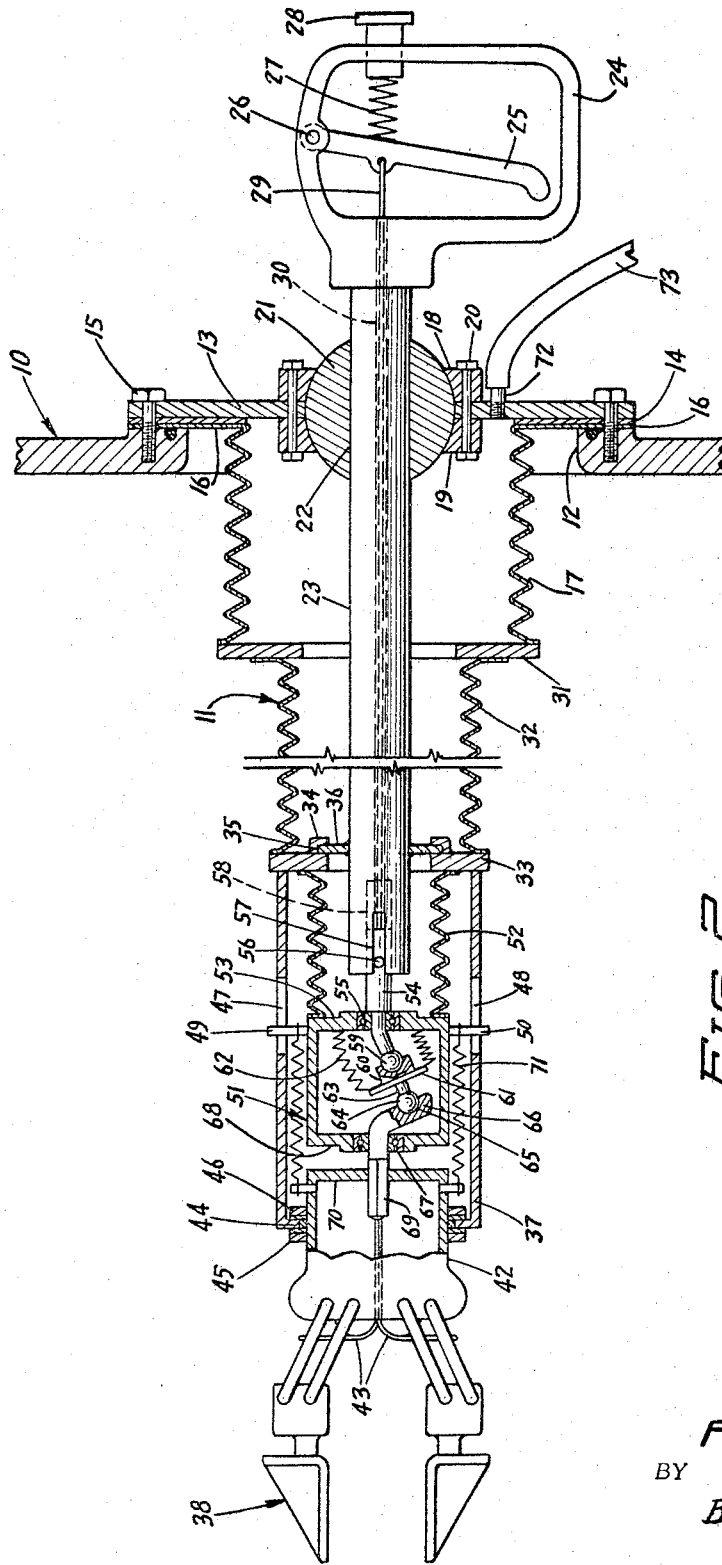

The invention is illustrated in the accompanying drawings in which the same numerals are used to identify corresponding parts and in which:

FIGURE 1 is a perspective view of one form of vacuum vessel in which the manipulator of the present invention may be utilized shown with a plurality of such manipulators installed therein; and FIGURE 2 is a side elevation, partly in section and partly broken away to show interior construction, of one of the manipulator arms.

Referring now to the drawings, in FIGURE 1 there is shown a vacuum vessel 10 in the form of a cylindrical tank and provided with suitable fittings for connection to a vacuum pump (not shown) for drawing of a high vacuum in the chamber within the tank. A plurality of sealed manipulators, each indicated generally at 11, extend through the walls of chamber 10, two being shown disposed in the cylindrical side wall and one being shown in the top wall. It will be noted that the manipulator arms disposed in the side wall are spaced about 120° apart. Suitable observation ports are provided. By the means of three such side wall manipulators and one top wall manipulator access may be had to all portions of the enclosed space.

Each entry 12 into the vacuum vessel 10 is provided with a cover plate 13 and a gasket ring 14 secured by a plurality of bolts 15 or similar fastening means. The flange 16 of a bellows 17, to be described in further detail hereinafter, also forms part of the vacuum-tight seal for each entry 12. Cover plate 13 supports a pair of bushing plates 18 and 19, one on either side, secured by bolts 20 or equivalent fastening means and together forming the socket of a ball and socket joint embracing a ball 21.

Ball 21 is provided with an axial passage 22 into which is fit an elongated rigid rod-like arm 23 which is longitudinally slidable relative to the ball. Arm 23 is provided with a handle 24 at its outside end. Handle 24 includes a lever 25 pivotally attached to the handle at 26 and adapted to be squeezed by the hand to permit the operator to close the tongs at the opposite end of the arm. Lever 25 is squeezed against a compression spring 27 whose tension can be adjusted by means of a control knob 28. A cable or rod 29 is secured to lever 25 and extends through a longitudinal passage 30 in arm 23 as described in greater detail hereinafter.

Arm 23 is partially enclosed by a surrounding vacuum-tight metal bellows 17 whose flange 16 is part of the vacuum-tight seal of entry 12 into the vacuum chamber. The opposite end of bellows 17 is welded or similarly secured to form a vacuum-tight seal to an annular step down plate 31 adjacent its outer periphery on one side. A smaller diameter vacuum-tight metal bellows 32 is similarly welded or otherwise attached in a vacuum-tight seal to the opposite surface of annular plate 31 adjacent the inner periphery thereof.

The opposite end of bellows 32 is secured to the outer periphery of a further annular plate 33. The surface of plate 33 within bellows 32 is provided with an annular flange member 34 whose inside diameter is approximately that of the opening in plate 33 and whose outside diameter is somewhat larger. Flange 34 is spaced from plate 33 so as to define an annular channel 35 in which the outer periphery of an annular plate 36 is fitted. Annular plate 36 is fixed to arm 23 adjacent its inner end away from the handle. Plate 36 is rotatable in channel 35 when the arm is rotated on ball 21. Plate 36 is also caged within channel 35 so that as arm 23 is moved longitudinally plate 33 is caused to move with the arm and cause bellows 32 and 17 to contract and expand.

A cylindrical housing 37 is fixed to the opposite surface of plate 33 so as to be movable with it as the arm is translated. Tong means, indicated generally at 38, are supported in the opposite end of housing 37 for rotation relative thereto. The tongs utilized in the manipulator according to this invention may be generally of the type described in detail in Goertz et al. Patent 2,695,715 issued Nov. 30, 1954, and Patent 2,764,301 issued Sept. 25, 1956, and Jelatis et al. Patent 3,139,990 issued July 7, 1964. All of these tong means have in common a pair of jaws each pivotally connected through a spring loaded parallel linkage to a body member, here indicated at 42, each jaw being operable as a result of force exerted on a cable 43. That force is transmitted by cable 29 in response to squeezing of lever 25 through a pair of sliding couplings, as described in detail hereinafter.

The tong body 42 is rotatable in the end of housing 37. The end of housing 37 is provided with an inwardly extending flange 44 fitted with a suitable bearing or bushing. Tong body 42 extends therein and is held by a pair of retaining rings 45 and 46. Housing 37 is provided with a pair of slots 47 and 48 which function as keyways for pins 49 and 50, respectively, which function as keys slidable in the slots.

Pins 49 and 50 are supported by a feed through housing 51 through which rotary motion is transmitted to the tongs, as hereinafter described. A further bellows 52 is sealed at one end to annular plate 37 adjacent the inner periphery thereof and at the other end to the end wall 53 of the feed through housing. An input crankshaft 54 is journalled in wall 53 in a suitable bushing or bearing 55. One end of crankshaft 54 is coupled to arm 23. A pin 56 carried by crankshaft 54 and disposed in slot 57 in the end of arm 23 keys the crankshaft to the arm for rotation therewith. At the same time, the end of crankshaft 54 is slidable in a somewhat enlarged socket 58 at the end of arm 23.

The opposite end of crankshaft 54 carries a ball 59 seated in a socket 60 carried by a circular plate 61 which in turn is carried by one end of bellows 62, the opposite end of which is secured to the inside wall 53 of feed through housing 51 in a vacuum-tight seal. The plate 61 is likewise secured to the bellows in a vacuum-tight seal. It will be seen that as crankshaft 54 is rotated in response to rotation of arm 23 by means of handle 24, the relative movement between ball 59 and socket 60 will cause plate 61 to rock in a rotary pattern without itself rotating. This rotary rocking motion is utilized to rotate the tong means through tong body 42.

A short shaft 63 on the opposite side of plate 61 from socket 60 carries a ball 64 which seats in a socket 65 in a crank arm 66, which in turn is journalled in a suitable bushing or bearing 67 in a wall 68 of the feed through housing 51. The opposite end 69 of crankshaft 66 is keyed into the end wall 70 of tong body 42. Rotary motion is imparted to crankshaft 66 through ball and socket 64–65 by the rotary rocking motion of plate 61. This motion is transmitted to rotate the tong means.

The coupling between the crankshaft end 69 and end wall 70 of tong body 42 permits the crankshaft to slide relative to the tong body. The ends of cables 43 are attached to the end 69 of crankshaft 66. The end of cable 29 is secured to the end of crankshaft 54. Thus, when the operator squeezes lever 25, the force transmitted by cable 29 causes crankshaft 54 to be drawn further into the socket 58 in the opposite end of arm 23. This causes the entire feed through housing to be drawn toward the handle, being guided in slot keyways 47 and 48 by means of pins 49 and 50, respectively. At the same time, the end 69 of crankshaft 66 slides relative to the end wall 70 of tong body 42. This relative movement of crankshaft 66 exerts a force on cables 43 which causes the jaws of the tongs means to be drawn together to grasp an article.

At the same time the tongs are being closed they may be rotated by rotation of arm 23, which motion is transmitted through the crank arms 54 and 66 and ball and socket couplings. Simultaneously, the arm may be translated in and out and moved up and down and to and fro on ball 21 in its socket. When the lever 25 is released the spring loaded linkages in the tong means, assisted by compression springs 71 extending between the tong body and feed through housing, open the jaws. The feed through housing is drawn toward the tong means. Crank arm 54 is drawn partially out from socket 58 in the end of arm 23. Crank arm 66 is retracted further into tong body 42. As feed through housing 51 moves in housing 37 in response to manipulation of lever 25, bellows 52 are caused to expand or contarct.

It will be seen that a continuous vacuum-tight shroud is formed around the manipulator arm by means of bellows 17, 32, 52 and 62 and that there is no penetration through the barrier formed thereby. The rotary motion is transmitted through end plate 61 of bellows 62 through ball and socket joints requiring no penetration of the vacuum barrier. The tong means may be moved within the vacuum chamber through the usual X, Y and Z motions and the tong means can be rotated and opened and closed. The operator may perform many and varied manipulative functions within the vacuum environment.

Where the pressure differential is great between the inside and outside of the vacuum vessel, a secondary line may be provided to equalize the pressure forces. A fitting 72 may be provided through cover plate 13 to which a vacuum hose 73 may be attached and connected to a vacuum pump.

Instead of a ball and socket joint to support the arm in the entry to the vacuum vessel, a gimbal may be substituted. When a gimbal is used the entry is desirably enclosed by an external bellows provided with fitting means to connect it to a secondary vacuum line.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A sealed manipulator for use in a vacuum comprising:
    (A) a rigid elongated arm extending through a chamber wall enclosing a vacuum and supported in a universal joint for rotary and longitudinal movement;
    (B) tong means connected to one end of said arm and handle means connected to the opposite ends;
    (C) a vacuum-tight rotary feedthrough between said arm and tong means for rotation of said tong means by said arm, said rotary feedthrough including:
        (I) a housing,
        (II) a bellows within said housing and connected to one wall thereof in a vacuum-tight seal,
        (III) a plate secured to the opposite end of said bellows in a vacuum-tight seal,
        (IV) a first crank arm journalled in one wall of said housing and extending into said bellows,
        (V) a universal coupling between the first crank arm and said plate within said bellows, whereby said plate is rocked in a rotary pattern upon rotation of said crank arm,
        (VI) a second crank arm journalled in the opposite wall of said housing, and
        (VII) a universal coupling between said second crank arm and the opposite side of said plate, whereby said crank arm is rotated upon rocking of said plate;
    (D) sliding coupling means between said arm and tong means for opening and closing said tong means from said handle; and
    (E) a vacuum-tight bellows surrounding said arm and extending from said rotary feedthrough to said chamber wall.

2. A sealed manipulator according to claim 1 further characterized in that each of said universal couplings is a ball and socket joint.

3. A sealed manipulator according to claim 1 further characterized in that:
    (A) flexible elongated linear motion transmission means extends from said manipulator handle to the opposite end of said manipulator arm,
    (B) a sliding coupling is provided between said first crank arm and the opposite end of said manipulator arm, (C) said linear motion transmission means is secured to said first crank arm, (D) said tong means includes a supporting body, a pair of jaws and linkages connecting said jaws to said body, (E) further flexible linear motion transmission means extend from said tong linkages to said body, (F) a sliding coupling is provided between said second crank arm and said tong body, and (G) said further motion transmission means is secured to said second crank arm.

4. A sealed manipulator according to claim 1 further characterized in that:

(A) a further housing is secured adjacent to the end of said vacuum-tight bellows for movement therewith, (B) said feedthrough housing is disposed within said further housing, (C) means are provided for restricting rotation of said feedthrough housing relative to said further housing while permitting relative longitudinal movement, and (D) a rotary coupling between said tong means and said further housing connect said tong means to said manipulator arm.

5. A sealed manipulator according to claim 1 further characterized in that said vacuum-tight bellows surrounds said universal joint supporting said manipulator arm in said chamber wall and is connected to said wall in a vacuum-tight seal, and an external fitting is provided in communication with the space enclosed by said bellows to connect the same with a vacuum pump to equalize the pressures within said bellows and said vacuum chamber.

6. A sealed manipulator for use in a vacuum comprising:

(A) a rigid elongated arm extending through a chamber wall enclosing a vacuum, (B) universal joint means supporting said arm in said wall, (C) a handle on said arm on one side of said wall, (D) said arm being movable longitudinally through said universal joint, (E) an annular plate rotatably coupled to said arm adjacent the end opposite from said handle, (F) a vacuum-tight bellows surrounding said arm and extending from said chamber wall to said plate, said bellows and said plate being extendable with longitudinal movement of said arm, (G) tong supporting means secured to said annular plate, (H) tong means rotatably secured to said tong supporting means spaced from said annular plate, said tong means including a slidably coupled crank for rotation thereof, (I) further plate means within said tong supporting means and non-rotatable relative thereto but movable longitudinally between said tong means and the end of said arm, (J) a further vacuum-tight bellows extending between said plates, (K) a vacuum-tight bellows sealed rotary feed through mounted on said further plate means, said feed through having an input shaft and an output crank, (L) a sliding coupling between said arm and the input shaft of said feed through, (M) said crank of said tong means being flexibly coupled to the output crank of said feed through for rotation of said tongs upon rotation of said arm, (N) said tongs being operable to open and close upon longitudinal movement of said slidably coupled crank of said tong means, (O) lever means in said handle and elongated link means extending through said arm from said lever to the input shaft of said feed through for operation of said tongs.

7. A sealed manipulator for use in a vacuum comprising:

(A) a rigid elongated arm extending through a chamber wall enclosing a vacuum and supported in a universal joint for rotary and longitudinal movement;

(B) tong means connected to one end of said arm and handle means connected to the opposite end;

(C) a vacuum-tight rotary feedthrough between said arm and tong means for rotation of said tong means by said arm;

(D) sliding coupling means between said arm and tong means for opening and closing said tong means from said handle;

(E) a vacuum-tight bellows surrounding said arm and extending from said rotary feedthrough to said chamber wall; and (F) said arm being provided with a rotary coupling adjacent one end of said arm connecting the same to said surrounding bellows, whereby said arm is rotatable relative to said bellows and said bellows is expanded and contracted upon translation of said arm.

References Cited

UNITED STATES PATENTS 1,644,825 10/1927 Fulton _____ 251—335.2 X
2,444,703 7/1948 Jones _____ 251—335.2 X

FOREIGN PATENTS 117,242 4/1958 U.S.S.R.

GEORGE F. ABRAHAM, *Assistant Examiner.*

GERALD M. FORLENZA, *Primary Examiner.*

UNITED STATES PATENT OFFICE
CERTIFICATE OF CORRECTION

Patent No. 3,426,920                                    February 11, 1969

Frank G. Chesley

It is certified that error appears in the above identified patent and that said Letters Patent are hereby corrected as shown below:

Column 4, line 2, "contarct" should read -- contract --. Column 6, line 52, "117,242" should read -- 117,241 --.

Signed and sealed this 17th day of March 1970.

(SEAL)
Attest:

Edward M. Fletcher, Jr.                              WILLIAM E. SCHUYLER, JR.

Attesting Officer                                            Commissioner of Patents